United States Patent Office 2,931,756
Patented Apr. 5, 1960

2,931,756

PRODUCTION OF DIHYDROSTREPTOMYCIN

Koiti Nakazawa, Higashitomatsu, Amagasaki, Motoo Shibata and Kazuo Tanabe, Toyonaka, Osaka, and Hiroichi Yamamoto, Mikage, Mikage-cho, Higashi-nada-ku, Kobe, Japan, assignors to Takeda Pharmaceutical Industries, Ltd., Doshomachi, Higashi-ku, Osaka, Japan Claims priority, application Japan March 24, 1956

7 Claims. (Cl. 195—80)

The present invention relates to the production of dihydrostreptomycin.

Dihydrostreptomycin is a very useful substance for medical treatment because it shows a strong and wide antibacterial spectrum like streptomycin and is, in addition, less toxic and more stable than the latter. Moreover, dihydrostreptomycin, which resembles streptomycin in antibacterial properties, has the advantage over the latter that it exhibits much lower neurotoxicity. Dihydrostreptomycin has so far been obtained by hydrogenation of the carbonyl radical of streptomycin and placed on the market as its sulfate or hydrochloride. These salts are colorless or white crystalline, or powdery substances. They are odorless or nearly odorless, taste slightly bitter, and their aqueous solutions are levorotatory, and an aqueous solution of the crystal of the sulfate shows $[\alpha]_D^{25} = -88°$ (c=1). It is well known that dihydrostreptomycin shows a wide antibacterial spectrum against gram-positive, gram-negative and acid-fast bacteria.

As mentioned before, dihydrostreptomycin has been prepared exclusively by reducing streptomycin isolated from the culture broth of *Streptomyces griseus*, etc. (U.S. Pat. No. 2,498,574), but this method requires highly pure streptomycin, otherwise a considerable loss by the reduction is inevitable.

The direct preparation of dihydrostreptomycin by the cultivation of dihydrostreptomycin-producing microorganisms has not been published in any report prior to the present invention. Such a method will simplify the preparation of dihydrostreptomycin, enhancing the yield and lowering the cost, and the embodiment thereof is a desideratum in this art.

A primary object of the present invention is the development and embodiment of such a method for the direct preparation of dihydrostreptomycin by the cultivation of dihydrostreptomycin-producing micro-organisms. The present invention has realized the said object with the aid of certain micro-organisms (strains of Streptomyces) which, when cultivated under appropriate conditions, produce dihydrostreptomycin in the culture broth in collectible amount. Briefly stated, the method of preparing dihydrostreptomycin, according to the present invention, is characterized by inoculating a dihydrostreptomycin-producing strain belonging to Streptomyces on a liquid medium and cultivating the strain aerobically to produce dihydrostreptomycin in an amount sufficient to be collected.

In the present invention any strain of any species belonging to Streptomyces may be used so far as it produces dihydrostreptomycin. For example, a new species separated and designated No. 23,572 by the present inventors can be used for the purpose. This species has the characteristics shown in the following table (the color names marked with Rdg in the table are based on Ridgway's Color Standards and Nomenclature):

STRAIN 23572

| Medium | Cultural characteristics | | | Remarks |
|---|---|---|---|---|
| | Growth | Aerial mycelium and spores | Soluble pigment | |
| Czapek agar | Colorless | White | None | |
| Glucose asparagine agar | do | White to smoke-gray (Rdg XLVI, 21″ "-d" or Vinaceous-buff (Rdg XL, 17‴-d). | do | Abundantly interspersed with small moist black patches which gradually spread over the whole surface. Reverse Cream-buff (Rdg XXX, 19″-d) or Cartridge-buff (Rdg XXX, 19″-f), later becoming Chamois (Rdg XXX, 19″-b). |
| Starch agar | do | White to pale smoke gray (Rdg XLVI, 21⁗-f). | do | Reverse Cream-buff (Rdg XXX, 19″-b). Hydrolysis slight. |
| Calcium malate agar | Colorless, later becoming buff-yellow (Rdg IV, 19-d). | Scanty white | do | |
| Glycerin nitrate agar | Colorless | do | do | |
| Dextrose nitrate agar | do | do | do | |
| Bouillon agar | do | None | do | |
| Gelatin | do | do | do | Moderate liquefaction. |
| Potato plug | do | White to smoke gray (Rdg XLVI, 21⁗-d). | do | Moist black patches observed. |
| Carrot plug | do | do | do | |
| Yeast extract agar | do | White to light drab (Rdg XLVI, 17⁗-b). | do | Partially moistened. |
| Whole egg | do | White | do | |
| Milk | do | do | do | Peptonization slowly. |
| Glycerin asparaginate agar | do | White to smoke gray (Rdg XLVI, 21⁗-d). | do | |
| Peptone nitrate broth | | | | Nitrate reduction. |

Aerial mycelium of this strain shows spiral, 0.8–1.2, conidia oval, 1–1.5μ×1.5–2μ.

Carbon utilization of the strain No. 23572, measured by the Pridham's method, is as follows:

| | |
|---|---|
| d(+)-Xylose | ++ |
| l(+)-Arabinose | +++ |
| l(+)-Rhamnose | +++ |
| d-Fructose | +++ |
| d-Galactose | +++ |
| Sucrose | +++ |
| Maltose | +++ |
| Lactose | ++ |
| d(+)-Raffinose | − |
| Inulin | − |
| d-Mannitol | +++ |
| d-Sorbitol | − |
| Dulsitol | − |
| dl-Inositol | − |
| Salicin | ++ |
| Na-acetate | − |
| Na-citrate | ± |
| Na-succinate | + |
| Control | − |

− = no growth.
+ = poor growth.
+++ = good growth.
± = growth doubtful.
++ = fair growth.

From the characteristics mentioned above, the species is a new species, and has been named *Streptomyces humidus* nov. sp. Nakazawa et Shibata.

Taxonomical comparison of this species with *Streptomyces hygroscopicus*, which resembles the former in property, is shown in the following table:

COMPARISON BETWEEN *STREPTOMYCES HUMIDUS* AND *STREPTOMYCES HYGROSCOPICUS*

| | St. humidus | St. hygroscopicus |
|---|---|---|
| Nutrient agar. | Colorless | Growth cream-colored, later yellowish gray with yellowish brown reverse. |
| Glucose asparagine. | Reverse cream-buff or cartridge-buff, later becoming chamois. Aerial mycelium white to smoke gray or vinaceous-buff. | Growth cream-colored to straw-yellow, later dull chrome-yellow to brownish-orange. Aerial mycelium white to pale yellowish-gray. |
| Potato plug. | Growth colorless. Aerial mycelium white to smoke gray. | Growth cream-colored, later yellowish gray to dull brownish. Aerial mycelium absent or trace of white. |

*Streptomyces hygroscopicus* produces hygroscopin according to J. Agr. Chem. Soc. (Japan) 28, 296 (1954) and Antibiotics and Chemotherapy 3, 1268 (1953), Carbomycin according to Antibiotics and Chemotherapy 3, 899 (1953), Angstmycin according to J. Antibiotics, Japan 7, 113 (1954), and Hygromycin according to Antibiotics and Chemotherapy 3, 1268 (1953), whereas *Streptomyces humidus* produces dihydrostreptomycin.

The above-mentioned *Streptomyces humidus* strain is hygroscopic, but some strains of the same species have no such property. Also, some form no aerial mycelium and others produce pigment.

The above strain represents only one example of the the strains useful in the present invention. Strains belonging to other species also can be used for the same purpose so far as they produce dihydrostreptomycin as a metabolite, even if they do not much resemble *Streptomyces humidus* nov. sp. in property.

As observed in micro-organisms, especially in Streptomyces, their behavior on the culture medium easily changes spontaneously or may be changed artificially, and therefore identification of a species is so difficult that a description of the properties of a species may not suffice for the identification of the species. Hence, the present invention includes, besides the above species, its variants isolated from soil, mutants induced from them by mutating agents such as X-ray, ultraviolet-ray and chemicals, and any strains isolated from soil basing on the findings of the present invention so far as they fulfil the necessary requirements.

Taxonomical characteristics of some mutants induced from *Streptomyces humidus* by the conventional mutating agents such as ultraviolet radiation and mono-spore separation are shown in the following table:

MUTANTS OF NO. 23572

| | 23572 G | 23572 Y | 23572 W |
|---|---|---|---|
| Glucose Asparagin Agar | Tea-green. | Pale orange-yellow. | White. |
| Starch Agar | White | do | Do. |
| Dextrose Nitrate Agar | do | Cream Color | Do. |
| Potato plug | Tea-green. | Capucine-buff later orange-yellow. | Do. |
| Glycerin asparaginate agar. | White | Pale orange-yellow. | Do. |

Most strains satisfying the requirements of the present invention do not resemble *Streptomyces griseus* taxonomically, and are resistant to both dihydrostreptomycin and streptomycin. Differing from the antibiotics obtained from streptomycin-producing strains, the crude antibiotics obtained from dihydrostreptomycin-producing strains are generally negative to maltol reaction. These properties can be advantageously utilized for separation of the desired strains from other strains. For example, with the properties as a criterion, the desired strains can be selectively separated by the dilution method or by cultivation on a medium containing dihydro-streptomycin.

As stated, dihydrostreptomycin is produced and accumulated, according to this invention, by the cultivation of the said strain on a liquid medium under aerobic conditions for a sufficient time. It is remarkable, and wholly unobvious and unexpected, that dihydrostreptomycin is produced as a metabolite by the cultivation of a micro-organism under aerobic conditions.

Various substances which are used as nutrient source for cultivation of general micro-organisms can be employed in the present method. As carbon source, starch, lactose, sucrose, dextrin, glycerin and maltose can for example be employed. And as nitrogen source, organic or inorganic nitrogen-containing substances such as soybean meal, meat extract, peptone, peanut powder, casein, amino acids, yeast, bran, corn-steep liquor, cotton-seed powder, nitrates, urea and ammonium compounds can be used. Also a small amount of inorganic salts and growth-promoting substances may be added to the medium. As other nutrient sources mycelia of a strain belonging to Penicillium or its culture broth may for instance be used. Any culture media suitable for the cultivation of *Streptomyces griseus* were found to fulfil the same purpose in the instant process. A precursor may also be added if necessary.

The culture medium may be solid or liquid, but an aerobic submerged culture is preferable for industrial purpose.

When *Streptomyces humidus* is used as the dihydrostreptomycin-producing micro-organism and the cultivation is conducted under aerobic submerged conditions, the cultivation may preferably be conducted at a temperature of about 24 to 30° C. over a period of 3 to 8 days, but the temperature and the period must be adjusted according to the other culture conditions. And, of course, when another micro-organism is used, the most preferable conditions for its nature should be employed.

In the case of liquid culture, the accumulation of dihydrostreptomycin can attain several ten to several thousand micrograms per cubic centimeter, but the dihydrostreptomycin can be effectively separated even from an about 10γ/cc. solution.

The dihydrostreptomycin may be isolated and purified in a variety of ways, advantageously after the manner set forth in application, Serial No. 647,682, filed on even date herewith, e.g. by filtering the fermentation broth to remove solid culture materials or substances precipitated after the cultivation. The active compound in the filtrate is adsorbed in a cation-exchanger and then eluted with an acid solvent. Thus a concentrated solution of the active compound containing a small quantity of impurities is obtained. The solution is further concentrated if necessary and subjected to adsorption chromatography to eliminate almost all the impurities.

The dihydrostreptomycin thus obtained is characterized by the following:

(A) *Physical and chemical properties*

Figure 1:
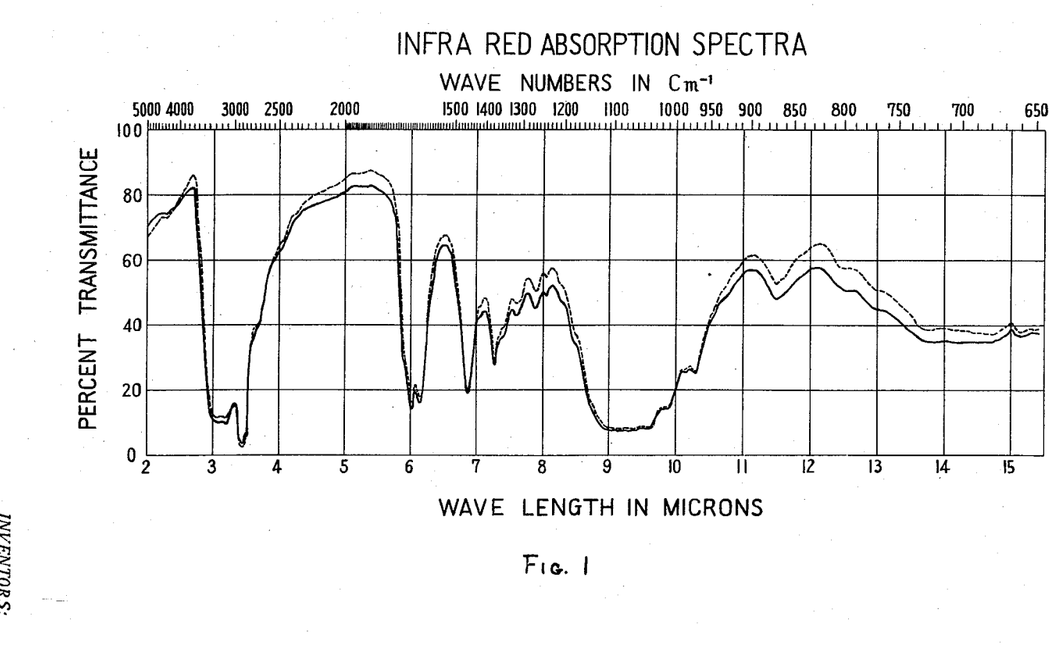
Figure 2:
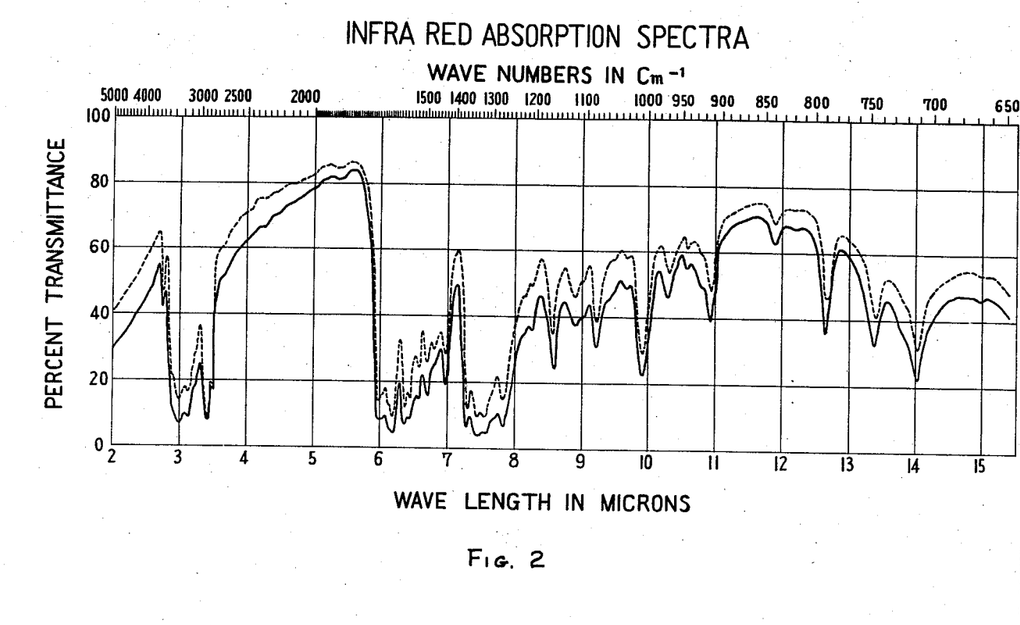
Figure 3:
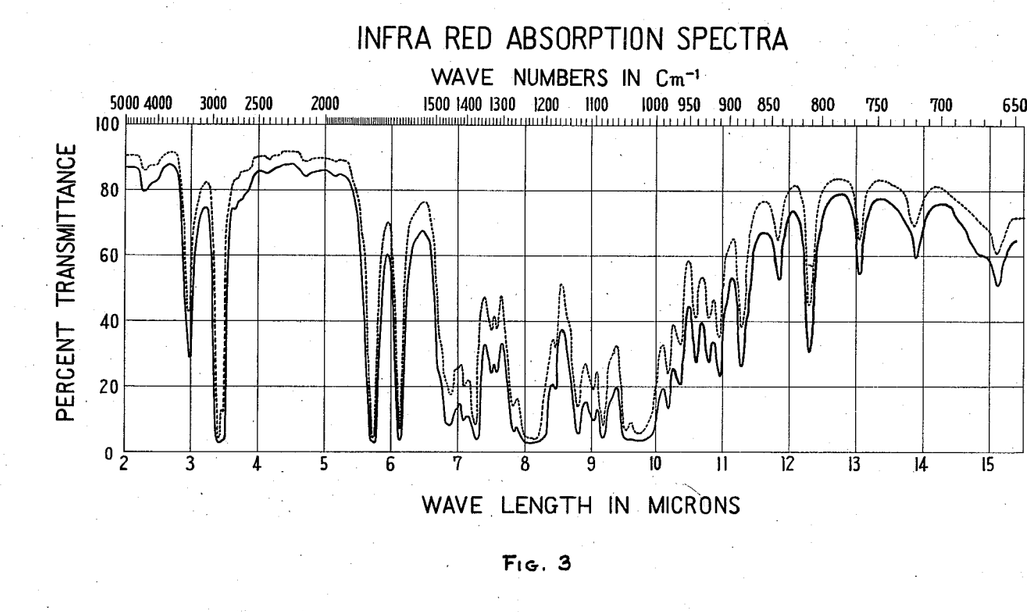

(1) Infra-red absorption spectrum was observed on the following derivatives induced from the product of the present invention (referred to as Antibiotic 23572 hereinafter) and commercial dihydrostreptomycin:

I. Sulfate,
II. Streptidine picrate,
III. α-Methylpentaacetyldihydrostreptobiosaminide.

As shown in the accompanying drawings, i.e. Figs. 1, 2 and 3 (correspond to I, II and III respectively), all the spectra were in complete accord with those of authentic samples, respectively. In the drawings, the curve drawn in solid-line shows the spectrum of a derivative of Antibiotic 23572 and that drawn in dotted-line shows that of a derivative of dihydrostreptomycin, respectively. All the spectra were measured in Nujol mull with sodium chloride prism.

(2) Ultraviolet spectra of sulfate of Antibiotic 23572 and an authentic sample of dihydrostreptomycin sulfate were in good agreement, and no specific adsorption was observed.

(3) Analytical value of the sulfate of Antibiotic 23572 is in accord with the theoretical value of dihydrostreptomycin sulfate.

The theoretical value for dihydrostreptomycin sulfate $[C_{21}H_{41}O_{12}N_7]_2 \cdot 3H_2SO_4$: C, 34.42; H, 6.05; N, 13.38; S, 6.56. Found: C, 34.45, 34.11; H, 6.42, 6.54; N, 12.98; S, 6.43.

(4) The sulfate of Antibiotic 23572 shows $[\alpha]_D^{25}$ −87.4° (c=1, $H_2O$), while dihydrostreptomycin sulfate exhibits $[\alpha]_D^{17}$ −86.0°.

The specific rotation of dihydrostreptomycin was reported as $[\alpha]_D^{25}$ −88° (I. A. Solomons et al.: Science 109, 515 (1949)) or as $[\alpha]_D^{25}$ −88.5° [F. J. Wolf et al.: J. Am. Chem. Soc., 68, 2163 (1946)].

(5) The sulfate of Antibiotic 23572 melts at 250–255° C. (with decomposition under blackening) and dihydrostreptomycin sulfate at 250–255° C. (with decomposition under blackening).

(6) Both Antibiotic 23572 and dihydrostreptomycin are negative to maltol reaction, but streptomycin is positive.

(7) Antibiotic 23572, dihydrostreptomycin and streptomycin are all positive to Sakaguchi reaction.

(8) Solutions of sulfate of Antibiotic 23572, dihydrostreptomycin sulfate and streptomycin sulfate in 0.1 N-NaOH at a concentration of 5 mg./cc. were left standing for 24 and 48 hours at room temperature, and the antibacterial potency against *B. subtilis* of each antibiotic was assayed by the dilution method to give the following results:

|  | immediately after dissolution, u./cc. | after 24 hrs., u./cc. | after 48 hrs., u./cc. |
| --- | --- | --- | --- |
| Sulfate of Antibiotic 23572 | 10,000 | >10,000 | 15,000 |
| Dihydrostreptomycin sulfate | 15,000 | >10,000 | 15,000 |
| Streptomycin sulfate | 10,000 | <100 | 75 |

Under an alkaline condition the sulfate of Antibiotic 23572 is as stable as dihydrostreptomycin sulfate.

(9) 30 mg./cc. of semicarbazide was added to each of the aqueous solutions of the sulfate of Antibiotic 23572, dihydrostreptomycin sulfate and streptomycin sulfate, and after standing at room temperature for 4 hours the antibacterial potency against *B. subtilis* of each antibiotic was assayed by the dilution method to give the following results:

|  | no semicarbazide is added, u./cc. | 4 hours after addition of semicarbazide, u./cc. |
| --- | --- | --- |
| Sulfate of Antibiotic 23572 (10 mg./cc.) | 35,000 | 35,000 |
| Dihydrostreptomycin sulfate (10 mg./cc.) | 35,000 | 50,000 |
| Streptomycin sulfate (10 mg./cc.) | 35,000 | <5,000 |

30 mg./cc. solution of semicarbazide shows potency of 75 u./cc.

(10) 1 mg./cc. of cysteine was added to each of the aqueous solutions of the sulfate of Antibiotic 23572, dihydrostreptomycin sulfate and streptomycin sulfate, and after standing at room temperature for 4 hours the antibacterial potency against *B. subtilis* of each antibiotic was assayed by the dilution method of give the following results:

|  | no cysteine is added, u./cc | 4 hours after addition of cysteine, u./cc. |
| --- | --- | --- |
| Sulfate of Antibiotic 23572 (5 mg./cc.) | 15,000 | 15,000 |
| Dihydrostreptomycin sulfate (5 mg./cc.) | 15,000 | 15,000 |
| Streptomycin sulfate (5 mg./cc.) | 15,000 | 7,500 |

1 mg./cc. solution of cysteine shows potency of 100 u./cc.

The sulfate of Antibiotic 23572 does not lose its activity by the addition of semi-carbazide or cysteine, as in the case of dihydrostreptomycin sulfate.

(11) Qualitative reaction for carbonyl radical is negative as shown below:

|  | Fehling Reagent | Phenol-conc. $H_2SO_4$ | Silver mirror reaction |
| --- | --- | --- | --- |
| Sulfate of Antibiotic 23572. | Negative | No colorization. | Brown, clear. |
| Dihydrostreptomycin sulfate. | do | do | Do. |
| Streptomycin sulfate | Brown precipitate. | Deep brown color. | Blacky brown precipitate. |

(12) Streptidine picrate was obtained from Antibiotic 23572 by the method of F. H. Stodola et al. (J. Am. Chem. Soc., 73, 2290 [1951]) as follows: 2 g. of the hydrochloride of Antibiotic 23572 was dissolved in 100 cc. of anhydrous methanol containing 1% of hydrogen chloride. After standing for 48 hours at room temperature, 200 cc. of ether was added to the solution with stirring and the resulting white crystals (streptidine hydrochloride) were separated by centrifugation. The crystals were dissolved in 20 cc. of water and a saturated picric acid solution was added. After standing for several hours the precipitated crystals were separated and recrystallized from water to give 400 mg. of streptidine picrate as yellowish needles melting at 271–273° C. *Analysis.*— Calcd. for $C_8H_{18}O_4N_6 \cdot 2C_6H_3N_3O_7$: C, 33.34; H, 3.36; N, 23.33. Found: C, 33.46; H, 3.44; N, 23.49. Infrared absorption spectrum of the picrate was in accord with that of the picrate prepared from dihydrostreptomycin as described in (1).

The supernatant of the above streptidine hydrochloride was neutralized with methanolic solution of sodium hydroxide, the resulting sodium chloride was separated by centrifugation, and the solvent was distilled off under reduced pressure, leaving white powder. The residue was dissolved in 20 cc. of pyridine and 7 cc. of acetic anhydride was added. After standing overnight, water was added to the reaction mixture and the solvent was distilled off. The residue was recrystallized from methanol to obtain α-methylpentaacetyldihydrostreptobiosaminide, colorless needless, M.P. 194.5° C. The yield was 700 mg.
Analysis.—Calcd. for $C_{13}H_{19}NO_8(CH_3CO)_5(OCH_3)$: C, 51.15; H, 6.62; N, 2.49. Found: C, 51.09; H, 6.73; N, 2.40 $[\alpha]_D^{17} = -120.0°$ (C=1%, chloroform). Infrared absorption spectrum of the resultant was in good agreement with that of α-methylpentaacetyldihydrostreptobiosaminide obtained from commercial dihydrostreptomycin as described in (1).

β-Methyl pentaacetyldihydrostreptobiosaminide was obtained from Antibiotic 23572 by the method of N. G. Brink (J. Am. Chem. Soc., 68, 2557 [1946]) as follows: 10 g. of the hydrochloride of Antibiotic 23572 was dissolved in 500 cc. of methanol containing 1% of hydrogen chloride. After standing overnight at room temperature, the solvent was distilled off under reduced pressure. The residue was dissolved in 750 cc. of methanol and 450 cc. of ether was added. The solution was passed through a column packed with 210 g. of acid-washed alumina impregnated with a 2:1 methanol-ether mixture. The column was then washed with 1000 cc. of a 3:2 methanol-ether mixture. The effluent was evaporated to dryness under reduced pressure. The residue was acetylated by being allowed to stand overnight at room temperature with 10 cc. of acetic anhydride and 10 cc. of pyridine. Water was then added and the solution was evaporated to dryness in vacuo. The residue was dissolved in chloroform and the chloroform solution was washed with water, dilute sulfuric acid and water successively. After the chloroform was distilled the brownish solid residue was boiled for about 2 minutes with 100 cc. of ether, and the ether solution was separated by decantation. The same process was repeated again. The ether insoluble fraction was crystallized from methanol, yielding α-methyl pentaacetyldihydrostreptobiosaminide, M.P. 194.5° C. The ether solution was concentrated to about 50 cc. and petroleum ether was added, giving white crystals. Recrystallization from methanol gave about 100 mg. of β-methyl pentaacetyldihydrostreptobiosaminide, M.P. 155–156° C. No depression of the melting point was observed, when mixed with the β-isomer prepared from dihydrostreptomycin as described above.

Analysis.—Calcd. for $C_{13}H_{19}NO_8(CH_3CO)_5(OCH_3)$: C, 51.15; H, 6.62; N, 2.49. Found: C, 50.71; H, 6.62; N, 2.65. $[\alpha]_D^{16} = -36°$ (c=1%), chloroform). Infrared spectrum of the resultant was in good agreement with that of β-methyl pentaacetyldihydrostreptobiosaminide obtained from dihydrostreptomycin.

A solution of 260 mg. of α-methyl pentaacetyldihydrostreptobiosaminide obtained from Antibiotic 23572 in 20 cc. of 10% hydrochloric acid was refluxed for three hours. After cooling, the brownish solution was decolorized with charcoal and evaporated to dryness in vacuo. The residue was acetylated with 1 cc. of acetic anhydride and 3 cc. pyridine at room temperature. After addition of water, the solution was evaporated to dryness. The residue was dissolved in 50 cc. of a 7:3 benzene-petroleum ether mixture. The solution was passed through a column packed with 4 g. of acid-washed alumina impregnated with petroleum ether, whereupon the acetylation product was adsorbed into the acid-washed alumina. The column was treated with 100 cc. of a 7:3 benzene-chloroform mixture to elute the objective substance. The effluent was concentrated to about 10 cc. and 30 cc. of ether was added to give crystals. Recrystallization from chloroform-ether gave 25 mg. of needles, pentaacetyl-N-methyl-L-glucosamine, M.P. 158–159° C.

Analysis.—Calcd. for $C_{17}H_{25}NO_{10}$: C, 50.62; H, 6.25; N, 3.47. Found: C, 50.71; H, 6.14; N, 3.24. $[\alpha]_D^{15} = -102°$ (c=0.7%, chloroform). Infrared absorption spectrum of the resultant was in complete agreement with that of pentaacetyl-N-methyl-L-glucosamine obtained from dihydrostreptomycin as described. No depression of the melting point was observed when mixed with pentaacetyl-N-methyl-L-glucosamine obtained from dihydrostreptomycin.

(13) Antibiotic 23572 was hydrolyzed with alkali under similar conditions used for hydrolysis of hydroxystreptomycin, described by F. H. Stodola et al. in J. Am. Chem. Soc., 73, 2290 (1951). That is, a solution of 2 g. of the hydrochloride of Antibiotic 23572 in 40 cc. of 1-N-NaOH was heated at 100° C. for 3 hours. The reaction mixture was acidified with hydrochloric acid and worked up, but no substance positive to maltol reaction nor a substance extractable under acidic conditions could be obtained, i.e. in this experiment Antibiotic 23572 gave a different result from those of streptomycin and hydroxystreptomycin. The same experiment with dihydrostreptomycin also gave the same result.

(14) To 50,000 γ/cc. aqueous solution of Antibiotic 23572 was added a warm solution of methyl-orange until no more precipitate was formed. The precipitate was filtered and recrystallized from methanol-water (1:3) to obtain the helianthate as scales, M.P. 222–225° C. (Potency: 340 streptomycin unit per mg.).

Analysis.—Calcd. for dihydrostreptomycin helianthate $(C_{63}H_{86}O_{21}N_{16}S_3)$: C, 50.46; H, 5.79; N, 14.94; S, 6.40. Found: C, 50.19, 50.84; H, 5.93, 5.95; N, 14.93; S, 6.80.

(15) Paper partition chromatography was tried on streptomycin and dihydrostreptomycin by F. H. Stodola et al. (J. Am. Chem. Soc., 73, 2290 [1951]), using water saturated butanol containing 2% of p-toluene sulfonic acid and 2% of piperidine as the solvent, and both compounds were distinguished by bioautogram.

Following the same method, paper chromatography was conducted on the above two compounds and Antibiotic 23572, and the bioautograms were examined using B. subtilis as test micro-organism. As the result, Antibiotic 23572 gave an inhibition zone at the site corresponding to that of dihydrostreptomycin.

(16) The crystallographical constants of the sulfate of Antibiotic 23572 were observed in comparison with those of dihydrostreptomycin sulfate reported by F. J. Wolf et al. (Science, 109, 515 [1949]). The results are as follows:

|  | Sulfate of Antibiotic 23572 | Dihydrostreptomycin sulfate |
| --- | --- | --- |
| α | 1.545±0.002 | 1.552±0.002 |
| β | 1.556±0.005 | 1.558±0.004 |
| γ | 1.564±0.002 | 1.566±0.002 |

(B) Chemotherapeutic effect

The growth inhibitory action of Antibiotic 23572 on streptomycin-sensitive H37Rv strain of human tubercle bacilli was nearly on the same level as dihydrostreptomycin, effecting inhibition of growth in a concentration of 1 to 2γ per milliliter in vitro. But it showed no inhibition of growth of the streptomycin-resistant strain of human type tubercle bacilli. The anti-bacterial activity of Antibiotic 23572 on the tubercle bacilli in vitro was considerably high, so its chemotherapeutic effect on experimental tuberculosis of mice and guinea pigs was further investigated as follows:

(1) *Chemotherapeutic effect on experimental tuberculosis of mice (I).*—Mice were infected intraperitoneally with 0.1 mg. (wet weight) of the H37Rv strain of human tubercle bacilli suspended in physiological saline (viable unit 8×10⁶). On the following day of the infection, treatment of these animals was started with 3.0 mg. of the sulfate of Antibiotic 23572 per day and 1.5 mg. of dihydrostreptomycin sulfate per day respectively. These drugs were injected subcutaneously once a day 18 times in total. Three weeks after the infection all the animals were killed, and a definite quantity each of finely ground pulmonary, hepatic and splenic tissues from each animal was inoculated on solid egg media for the cultivation of tubercle bacilli. Counting the colonies of tubercle bacilli that developed on the media 4 weeks later, the antituberculous activities of the drugs were estimated. The results are as shown in the following table:

UNTREATED CONTROL GROUP

| Animal No | 7 | 8 | 9 | 10 | 11 | 12 | 13 | 14 | 15 |
|---|---|---|---|---|---|---|---|---|---|
| Lung | 0 | 29 | 0 | 0 | 10 | 13 | 16 | 30 | 57 |
| Liver | 0 | 25 | 5 | 0 | 2 | 0 | 2 | 8 | 2 |
| Spleen | 8 | >600 | 2 | 34 | 228 | 70 | 5 | >600 | 247 |

DIHYDROSTREPTOMYCIN SULFATE (1.5 MG.) GROUP

| Animal No | 3 | 4 | 5 | 6 | 7 | 8 | 9 | 10 |
|---|---|---|---|---|---|---|---|---|
| Lung | 0 | 0 | 0 | 0 | 0 | 0 | 0 | 0 |
| Liver | 0 | 0 | 1 | 0 | 0 | 0 | 0 | 0 |
| Spleen | 0 | 0 | 9 | 0 | 0 | 1 | 0 | 2 |

SULFATE OF ANTIBIOTIC 23572 (3.0 MG.) GROUP

| Animal No | 2 | 3 | 4 | 5 | 6 | 7 | 8 | 9 | 10 |
|---|---|---|---|---|---|---|---|---|---|
| Lung | 0 | 0 | 0 | 0 | 0 | 0 | 0 | 0 | 0 |
| Liver | 0 | 0 | 0 | 1 | 0 | 0 | 0 | 0 | 0 |
| Spleen | 5 | 6 | 1 | 3 | 9 | 4 | 21 | 18 | 0 |

As seen from the above table, subcutaneous administration of the sulfate of Antibiotic 23572 amounting to 54 mg. showed remarkable therapeutic effect on the experimental tuberculosis of mice, and that it is as effective as the subcutaneous injection of dihydrostreptomycin sulfate amounting to 27 mg.

(2) *Chemotherapeutic effect on experimental tuberculosis of mice (II).*—Mice were infected intravenously with 0.001 mg. (wet weight) of the H37Rv strain of human tubercle bacilli suspended in 0.25 cc. of physiological saline (viable unit $24 \times 10^4$). On the second day of the infection, treatment of these animals was started. The drugs were administered subcutaneously 18 times over a period of 3 weeks as follows:

All the animals were killed 25 days after infection and the chemotherapeutic effect of the drugs was estimated as described before.

Medication:
  Sulfate of Antibiotic 23572, 1.5 mg./day, 18 times, subcutaneously
  Sulfate of Antibiotic 23572, 3.0 mg./day, 18 times, subcutaneously
  Dihydrostreptomycin sulfate, 1.5 mg./day, 18 times, subcutaneously

UNTREATED CONTROL GROUP

| Animal No | 6 | 7 | 8 | 9 | 10 | 11 | 12 | 13 | 14 |
|---|---|---|---|---|---|---|---|---|---|
| Lung | 198 | 221 | >600 | 88 | 113 | 310 | 72 | 166 | 338 |
| Liver | 2 | 14 | 25 | 25 | 20 | 44 | 24 | 32 | 4 |
| Spleen | 17 | 57 | 549 | 110 | 372 | 103 | 83 | >600 | 235 |

DIHYDROSTREPTOMYCIN SULFATE (1.5 MG.) GROUP

| Animal No | 2 | 3 | 4 | 5 | 6 | 7 | 8 | 9 | 10 |
|---|---|---|---|---|---|---|---|---|---|
| Lung | 7 | 61 | 5 | 58 | 10 | 0 | 44 | 10 | 0 |
| Liver | 3 | 1 | 0 | 0 | 2 | 0 | 2 | 0 | 5 |
| Spleen | 31 | 63 | 95 | 0 | 9 | 0 | 43 | 68 | 8 |

SULFATE OF ANTIBIOTIC 23572 (1.5 MG.) GROUP

| Animal No | 2 | 3 | 4 | 5 | 6 | 7 | 8 | 9 | 10 |
|---|---|---|---|---|---|---|---|---|---|
| Lung | 19 | 5 | 1 | 10 | 38 | 1 | 102 | 1 | 5 |
| Liver | 8 | 0 | 1 | 1 | 1 | 2 | 4 | 0 | 0 |
| Spleen | 155 | 29 | 7 | 14 | 75 | 29 | 48 | 16 | 76 |

SULFATE OF ANTIBIOTIC 23572 (3.0 MG.) GROUP

| Animal No | 4 | 5 | 6 | 7 | 8 | 9 | 10 |
|---|---|---|---|---|---|---|---|
| Lung | 0 | 1 | 43 | 9 | 0 | 16 | 6 |
| Liver | 0 | 0 | 1 | 2 | 0 | 1 | 0 |
| Spleen | 10 | 2 | 12 | 11 | 11 | 7 | 0 |

As shown in the above table, the therapeutic effect of Antibiotic 23572 on experimental tuberculosis of mice was as remarkable as dihydrostreptomycin.

(3) *Chemotherapeutic effect on experimental tuberculosis of guinea pigs.*—Healthy guinea pigs which showed negative tuberculin reaction (OT, 1:10, 0.1 cc., intracutaneously, 48 hours) were infected subcutaneously with 0.01 mg. (wet weight) of the H37Rv strain of human tubercle bacilli suspended in 0.5 cc. of physiological saline (viable unit $35 \times 10^5$). About one month after the infection all of these animals became positive to tuberculin. At this time, 5 animals selected at random were autopsied, when the establishment of gross tuberculous lesions in the organs of each animal was confirmed. Then, the remaining animals were divided into 4 groups and treated as indicated below. When the drugs had been administered subcutaneously 30 and 60 times (ca. 10 weeks and 15 weeks after infection, respectively), several animals of each group were autopsied, and all the remaining animals were killed 6 weeks after the end of the treatment (21 weeks after infection). The amount of gross tuberculous lesions in organs of these animals was estimated, and also a definite quantity each of the regional lymphnode of primary infection site, lung, liver and spleen of every animal was finely ground and inoculated on solid egg media for the cultivation of tubercle bacilli, and colonies which developed during 6 weeks' incubation were counted. On the ground of these findings, the chemotherapeutic effects of the drug on experimental tuberculosis of guinea pigs were estimated.

Medication:
  Group 1—Sulfate of Antibiotic 23572, 10 mg./day, subcutaneously
  Group 2—Sulfate of Antibiotic 23572, 20 mg./day, subcutaneously
  Group 3—Dihydrostreptomycin sulfate, 10 mg./day, subcutaneously
  Group 4—Untreated control The number of colonies obtained from the cultivation of tubercle bacilli is shown in the following tables:

NUMBER OF COLONIES OF TUBERCLE BACILLI AFTER 6 WEEKS' CULTIVATION

[10 mg. of finely ground regional lymphnode, lung, liver and spleen were inoculated on solid egg media.]

CULTIVATED AT THE TIME OF AUTOPSY JUST BEFORE THE START OF TREATMENT

| Animal No | 1 | 2 | 3 | 4 | 5 |
|---|---|---|---|---|---|
| Lung | 2 | 0 | 2 | 0 | 2 |
| Liver | 8 | 2 | 8 | 13 | 1 |
| Spleen | 224 | 4 | 5 | 142 | 6 |
| Lymphnode | >600 | >600 | >600 | >600 | >600 |

CULTIVATED AT THE TIME OF AUTOPSY AFTER 30 TIMES MEDICATION (Group 4)

| Animal No | 11 | 12 | 13 | 14 | 15 | 16 | 17 |
|---|---|---|---|---|---|---|---|
| Lung | 0 | 0 | 0 | 97 | 18 | 83 | 0 |
| Liver | 0 | 7 | 0 | 0 | 1 | 0 | 0 |
| Spleen | 0 | 2 | 19 | 91 | 56 | 8 | 10 |
| Lymphnode | 0 | 141 | 518 | 315 | 209 | 352 | 188 |

11

(Group 3)

| Animal No. | 5 | 6 | 7 | 8 | 9 | 10 | 11 | 12 |
|---|---|---|---|---|---|---|---|---|
| Lung | 7 | 1 | 0 | 93 | 0 | 0 | 0 | 0 |
| Liver | 5 | 62 | 1 | 21 | 0 | 0 | 0 | 0 |
| Spleen | 23 | 17 | 7 | 0 | 0 | 0 | 1 | 0 |
| Lymphnode | 62 | 32 | 22 | 118 | 2 | 102 | 110 | 0 |

(Group 1)

| Animal No. | 2 | 3 | 4 | 5 | 6 | 7 | 8 | 9 |
|---|---|---|---|---|---|---|---|---|
| Lung | 0 | 0 | 0 | 0 | 0 | 0 | 0 | 0 |
| Liver | 0 | 0 | 0 | 0 | 0 | 0 | 0 | 0 |
| Spleen | 8 | 0 | 0 | 21 | 28 | 0 | 0 | 0 |
| Lymphnode | 5 | 52 | 13 | 0 | 0 | 19 | 134 | 40 |

(Group 2)

| Animal No. | 4 | 5 | 6 | 7 | 8 | 9 | 10 | 11 |
|---|---|---|---|---|---|---|---|---|
| Lung | 0 | 0 | 0 | 0 | 0 | 0 | 0 | 0 |
| Liver | 0 | 0 | 0 | 0 | 0 | 0 | 0 | 0 |
| Spleen | 0 | 0 | 0 | 0 | 3 | 0 | 0 | 0 |
| Lymphnode | 3 | 3 | 3 | 0 | 0 | 36 | 0 | 35 |

CULTIVATED AT THE TIME OF AUTOPSY AFTER 60 TIMES MEDICATION

(Group 4)

| Animal No. | 25 | 26 | 27 | 28 | 29 |
|---|---|---|---|---|---|
| Lung | 9 | 1 | 134 | 10 | 1 |
| Liver | 7 | 0 | 0 | 0 | 2 |
| Spleen | 333 | 1 | 13 | 293 | 3 |
| Lymphnode | 195 | 325 | 187 | 89 | 138 |

(Group 3)

| Animal No. | 14 | 15 | 16 | 17 | 18 | 19 | 20 |
|---|---|---|---|---|---|---|---|
| Lung | 0 | 0 | 0 | 0 | 0 | 0 | 0 |
| Liver | 1 | 0 | 0 | 0 | 0 | 0 | 0 |
| Spleen | 1 | 0 | 0 | 0 | 0 | 0 | 0 |
| Lymphnode | 6 | 0 | 2 | 0 | 2 | 0 | 0 |

(Group 1)

| Animal No. | 11 | 12 | 13 | 14 | 15 | 16 | 17 |
|---|---|---|---|---|---|---|---|
| Lung | 0 | 0 | 0 | 0 | 3 | 0 | 0 |
| Liver | 0 | 0 | 0 | 0 | 0 | 0 | 0 |
| Spleen | 0 | 0 | 0 | 0 | 0 | 0 | 0 |
| Lymphnode | 5 | 89 | 0 | 0 | 2 | 5 | 0 |

(Group 2)

| Animal No. | 14 | 15 | 16 | 17 | 18 | 19 | 20 |
|---|---|---|---|---|---|---|---|
| Lung | 0 | 0 | 0 | 0 | 0 | 0 | 0 |
| Liver | 0 | 0 | 1 | 0 | 0 | 0 | 0 |
| Spleen | 0 | 0 | 0 | 0 | 0 | 0 | 0 |
| Lymphnode | 2 | 20 | 6 | 0 | 3 | 17 | 0 |

CULTIVATED AT THE TIME OF AUTOPSY 6 WEEKS AFTER THE END OF MEDICATION

(Group 4)[1]

| Animal No. | 32 | 33 | 34 | 35 | 36 | 37 |
|---|---|---|---|---|---|---|
| Lung | 84 | 4 | >600 | 11 | 173 | 0 |
| Liver | 36 | [2]C | 88 | 2 | >600 | 0 |
| Spleen | 131 | 48 | >600 | [2]C | >600 | 1 |
| Lymphnode | >600 | 8 | >600 | 87 | >600 | 182 |

[1] 4 of 6 animals died during the last 3 weeks of experiment.
[2] C indicates contamination.

12

(Group 3)

| Animal No. | 23 | 24 | 25 | 26 | 27 |
|---|---|---|---|---|---|
| Lung | 0 | 0 | 0 | 0 | 0 |
| Liver | 0 | 4 | 0 | 0 | 0 |
| Spleen | 47 | 30 | 0 | 0 | 56 |
| Lymphnode | 32 | 140 | 21 | 283 | 111 |

(Group 1)

| Animal No. | 19 | 20 | 21 | 22 | 23 | 24 | 25 | 26 | 27 |
|---|---|---|---|---|---|---|---|---|---|
| Lung | 0 | 0 | 0 | 0 | 0 | 0 | 0 | 0 | 0 |
| Liver | 0 | 0 | 0 | 0 | 0 | 0 | 0 | 0 | 0 |
| Spleen | 6 | 0 | 0 | 0 | 0 | 0 | 0 | 0 | 212 |
| Lymphnode | 48 | 34 | 4 | 1 | 98 | 190 | 7 | 60 | 116 |

(Group 2)

| Animal No. | 21 | 22 | 23 | 24 | 25 | 26 | 27 |
|---|---|---|---|---|---|---|---|
| Lung | 0 | 0 | 0 | 0 | 0 | 0 | 0 |
| Liver | 0 | 0 | 0 | 0 | 0 | 0 | 1 |
| Spleen | 3 | 0 | 0 | 0 | 0 | 0 | 87 |
| Lymphnode | 1 | 30 | 2 | 10 | 18 | 2 | 35 |

(4) *Toxicity.*—The $LD_{50}$ values in mice ($CF_1$) of the sulfate of Antibiotic 23572 and dihydrostreptomycin sulfate were calculated by Litchfield and Wilcoxon's method. As shown below, no significant difference was found between them:

| | Sulfate of Antibiotic 23572, mg./kg. | Dihydrostreptomycin sulfate, mg./kg. |
|---|---|---|
| Intravenous injection | 250 (219–285) | 240 (215–268) |
| Subcutaneous injection | 2,000 (1,710–2,310) | 1,800 (1,450–2,250) |
| Intraperitoneal injection | 1,900 (1,500–2,390) | 1,700 (1,430–2,020) |

(C) Antibacterial spectrum

The sulfate of Antibiotic 23572 was compared with the commercial dihydrostreptomycin sulfate in weight for causing complete inhibition of test micro-organisms to give the following results:

ANTIBACTERIAL SPECTRUM

| Micro-organism | Sulfate of Antibiotic 23572, mcg./ml. | A commercial dihydrostreptomycin sulfate, mcg./ml. |
|---|---|---|
| *Staphylococcus aureus* Terajima | 1 | 1 |
| *Bacillus subtilis* (PCI-219) | 0.5 | 0.5 |
| *Salmonella typhose* | 64 | 64 |
| *Shigella dusenteriae* | 1 | 1 |
| *Vibrio choleras* | 8 | 8 |
| *Proteus vulgaris* | 8 | 8 |
| *Escherichia coli* | 4 | 4 |
| *Pseudomonas aeruginosa* | 32 | 32 |
| *Aspergillus niger* | >100 | >100 |
| *Penicillium notatum* | >100 | >100 |
| *Sacharomyces cerevisiae* | >100 | >100 |
| *Candida albicans* | >100 | >100 |
| *Mycobacterium 607* | 2.0 | 2.0 |
| *Mycobacterium avium* | 1.0 | 1.0 |

The foregoing procedures are described in more detail in the following examples, but these are given by way of illustration and not for the purpose of limitation. In these examples, the antibiotic potency is assayed by the "cylinder-plate method" using *Bacillus subtilis* (PCI 219) as the test organism, except when the method for assay is particularly noted:

Example 1

Percent by weight

| | |
|---|---|
| Glucose | 2.0 |
| Meat extract | 0.6 |
| Peptone | 1.0 |
| Table salt | 0.6 |
| Calcium carbonate | 0.6 |

500 liters of a culture medium containing the above components was sterilized by heating in a cultivating vessel. A strain belonging to *Streptomyces humidus* was inoculated and cultivation was conducted at 27–28° C. for 96 hours under aerobic conditions with agitation, whereupon the fermentation broth exhibited the following antibacterial potency: 500 mcg./ml. against *B. subtilis*.

Example 2

| | Percent by weight |
|---|---|
| Corn steep liquor | 3.0 |
| Starch | 3.0 |
| Peptone | 0.5 |
| Potassium dihydrogen phosphate | 0.1 |
| Magnesium sulfate | 0.05 |
| Calcium carbonate | 0.3 |

50 cc. of a culture medium containing the above components was sterilized in a shaking flask by a conventional method. A strain belonging to *Streptomyces humidus* was inoculated and cultivated at 27±1° C. for 4 days with shaking, whereupon antibacterial potency of the fermentation broth reached 1200 mcg./ml. against *B. subtilis*.

The strain employed in Examples 1, 2 and 9 is strain 23572 (original) belonging to *Streptomyces humidus*, respectively.

Example 3

Strain H-120, which belongs to *Streptomyces humidus*, was cultivated on various screening culture media. The results are shown in the following table. Each culture, shown in Examples 3–8, was conducted with shaking at 26–28° C. using 50 cc. of the medium in 300 cc. flask.

| Medium | Maximum potency of dihydro-strepto-mycin, mcg./ml. | Time for obtaining maximum potency, hours |
|---|---|---|
| Starch bouillon | 78 | 120 |
| Glucose bouillon | 225 | 120 |
| Starch bouillon plus CaCO₃, 3.0% | 211 | 144 |
| Glucose bouillon plus CaCO₃, 3.0% | 286 | 120 |
| (1) | 227 | 120 |
| (2) | 246 | 96 |
| (3) | 329 | 120 |
| (4) | 242 | 120 |
| (2) plus Yeast extract 0.5% | 315 | 120 |

| | Percent |
|---|---|
| (1) Glucose | 1.0 |
| Soybean meal | 1.0 |
| Peptone | 0.5 |
| NaCl | 0.5 |
| CaCO₃ | 0.3 |
| (2) Corn steep liquor | 3.0 |
| Starch | 3.0 |
| Peptone | 0.5 |
| K₂HPO₄ | 0.1 |
| MgSO₄·7H₂O | 0.05 |
| CaCO₃ | 0.3 |
| (3) Glucose | 2.0 |
| Meat extract | 0.6 |
| Peptone | 1.0 |
| NaCl | 0.6 |
| CaCO₃ | 0.6 |
| (4) Starch | 0.5 |
| Meat extract | 0.3 |
| Yeast extract | 0.5 |
| Peptone | 0.5 |
| Glucose | 1.0 |
| NaCl | 0.3 |

All percentages in this and in the following percentages are by weight.

Example 4

Basal medium:

| | | |
|---|---|---|
| Starch | percent | 3.0 |
| K₂HPO₄ | do | 0.1 |
| MgSO₄·7H₂O | do | 0.05 |
| CaCO₃ | do | 0.3 |
| pH | | 7.0 |

Corn steep liquor and soybean meal were added at various rates as nitrogen sources to the basal medium, and strain H-120 of *Streptomyces humidus* was inoculated and cultivated to obtain the results shown in the table below:

| Nitrogen source | | Maximum potency of dihydro-strepto-mycin, mcg./ml. | Time for obtaining maximum potency, hours |
|---|---|---|---|
| Corn steep liquor, percent | Soybean meal, percent | | |
| 3.0 | 1.0 | 468 | 120 |
| | 3.0 | 288 | 144 |
| 3.0 | 2.0 | 499 | 144 |
| 1.5 | 1.0 | 417 | 120 |
| 3.0 | 0.5 | 372 | 144 |
| 3.0 | ¹ 1.0 | 968 | 144 |

¹ Soybean meal was hydrolyzed by heating at 100° C. for 1 hour with 10 times its volume of 5% hydrochloric acid.

Example 5

Basal medium:

| | | |
|---|---|---|
| Starch | percent | 3.0 |
| K₂HPO₄ | do | 0.1 |
| MgSO₄·7H₂O | do | 0.05 |
| CaCO₃ | do | 0.3 |
| pH | | 7.0 |

Strain H-120 of *Streptomyces humidus* was cultivated on various media which contained, beside the basal components, corn steep liquor and soybean meal as principal nitrogen sources, and other organic or inorganic nitrogen sources. In some cases, soybean meal was omitted. The results are shown in the following table:

| Nitrogen source | | | | Maximum potency of dihydro-strepto-mycin, mcg./ml. | Time for obtaining maximum potency, hours |
|---|---|---|---|---|---|
| Corn steep liquor, percent | Soybean meal (HCl-hydrolyzate), percent | Others, percent | | | |
| 3.0 | 1.0 | Mycelium of 23572 (wet) | 2.0 | 660 | 144 |
| 3.0 | 1.0 | NH₄NO₃ | 0.1 | 326 | 120 |
| 3.0 | 1.0 | CO(NH₂)₂ | 0.1 | 55 | 96 |
| 3.0 | 1.0 | {CO(NH₂)₂ | 0.1 | 60 | 96 |
| | | Lard oil | 1.0 | | |
| 3.0 | 1.0 | (NH₄)₂HPO₄ | 0.1 | 411 | 120 |
| 3.0 | 1.0 | KNO₃ | 0.1 | 600 | 96 |
| 3.0 | 1.0 | NH₄Cl | 0.1 | 327 | 120 |
| 3.0 | 1.0 | (NH₄)₂SO₄ | 0.1 | 396 | 144 |
| 3.0 | | Casein | 1.0 | 500 | 120 |
| 3.0 | | Casein ¹ | 1.0 | 1,000 | 144 |
| 1.0 | 1.0 | Rice bran | 2.0 | 30 | 168 |

¹ Casein was hydrolyzed at 100° C. for 1 hour with about 10 times its volume of 5% HCl.

Example 6

Basal medium:

| | |
|---|---|
| Corn steep liquor | percent 3.0 |
| Soybean meal (HCl-hydrolyzate) | do 1.0 |
| $K_2HPO_4$ | do 0.1 |
| $MgSO_4 \cdot 7H_2O$ | do 0.05 |
| $CaCO_3$ | do 0.3 |
| pH | 7.0 |

Strain Q-97 of *Streptomyces humidus* was cultivated on the basal medium in which the carbon source was changed variously. The results were as shown in the following table:

| Carbon source | Percent | Maximum potency of dihydrostreptomycin, mcg./ml. | Time for obtaining maximum potency, hours |
|---|---|---|---|
| Dextrin | 3.0 | 1,127 | 120 |
| Starch | 1.0 | 600 | 120 |
| Starch | 3.0 | 844 | 120 |
| Glucouse | 1.0 | 592 | 120 |
| Glucose | 3.0 | 440 | 120 |
| Glycerin | 3.0 | 1,050 | 144 |
| Lactose | 3.0 | 90 | 96 |
| Mannose | 3.0 | 1,368 | 144 |
| Maltose | 3.0 | 90 | 120 |
| Galactose | 3.0 | 1,870 | 144 |
| Fructose | 3.0 | 1,390 | 144 |
| Sucrose | 3.0 | 63 | 144 |

Example 7

Strain Q-97 of *Streptomyces humidus* was cultivated on various media, in which nitrogen sources were corn steep liquor and soybean meal, and carbon source was dextrin, but the composition of inorganic salts was changed variously. The results are shown in the table below.

Basal medium:

| | |
|---|---|
| Dextrin | percent 3.0 |
| Corn steep liquor | do 3.0 |
| Soybean meal (HCl-hydrolyzate) | do 1.0 |
| pH | 7.0 |

| Inorganic salts | | | | Maximum potency of dihydrostreptomycin, mcg./ml. | Time for obtaining maximum potency, hours |
|---|---|---|---|---|---|
| $K_2HPO_4$, percent | $MgSO_4 \cdot 7H_2O$, percent | $CaCO_3$ percent | Others | | |
| | 0.05 | 0.3 | | 717 | 120 |
| 0.1 | | 0.3 | | 675 | 120 |
| 0.1 | 0.05 | 0.6 | | 1,230 | 144 |
| 0.1 | 0.05 | 0.3 | (¹) | 700 | 144 |
| 0.1 | 0.05 | 1.0 | | 1,260 | 120 |
| 0.1 | 0.05 | 0.3 | $ZnSO_4 \cdot 7H_2O$, 0.001% | 639 | 144 |
| 0.1 | 0.05 | 0.3 | $MnSO_4 \cdot 7H_2O$, 0.002% | 555 | 144 |
| 0.1 | 0.05 | 0.3 | $FeSO_4 \cdot 7H_2O$, 0.002% | 1,165 | 120 |
| 0.1 | 0.05 | 0.3 | $Na_2SO_4$ (anhydrous), 0.1% | 1,099 | 144 |
| 0.1 | 0.05 | 0.3 | $CuSO_4 \cdot 5H_2O$, 0.002% | 1,038 | 120 |

¹ Neutralization of hydrolyzate of soybean meal and adjustment of pH were conducted with potassium hydroxide.

Example 8

Medium:

| | |
|---|---|
| Dextrin | percent 3.0 |
| Corn steep liquor | do 3.0 |
| HCl-hydrolyzate of soybean meal | do 1.0 |
| $K_2HPO_4$ | do 0.1 |
| $MgSO_4 \cdot 7H_2O$ | do 0.05 |
| $CaCO_3$ | do 0.37 |
| pH | 7.0 |

Mutants obtained by treating *Streptomyces humidus* in various ways were cultivated on the above medium. The results are shown in the table below:

| Mutants | | | Maximum potency of dihydrostreptomycin, mcg./ml. | Time for obtaining maximum potency, hours |
|---|---|---|---|---|
| Strains | Induced from— | Methods for mutation ¹ | | |
| 23572 (Original) | | | 660 | 144 |
| B-9 | A-113 | M | 460 | 144 |
| A-113 | 23572 | M | 846 | 120 |
| C-46 | B-9 | D | 792 | 120 |
| E-96 | C-46 | UV | 433 | 144 |
| H-106 | E-96 | D | 1,220 | 144 |
| K-34 | H-106 | UV | 1,248 | 144 |
| $U_D$-1 | K-34 | D | 1,308 | 144 |
| Q-97 | N | M | 1,296 | 144 |
| $V_D$ | Q-97 | D | 888 | 144 |
| N | E-93 | D | 931 | 144 |
| Tu | L | UV | 574 | 120 |
| $V_P$ | Q-97 | M | 975 | 120 |
| $V_U$ | Q-97 | UV | 1,235 | 144 |
| L | H-106 | D | 840 | 120 |
| Y | 23572 | UV | 966 | 120 |
| G | 23572 | UV | 374 | 120 |
| Q | N | M | 1,085 | 120 |

¹ Methods for mutation: M means mono-spore separation, D means inoculation of the strain on a dihydrostreptomycin-containing medium, UV means ultraviolet-ray radiation of the strain.

Example 9

Medium:

| | |
|---|---|
| Glucose | percent 2.0 |
| Meat extract | do 0.6 |
| Peptone | do 1.0 |
| NaCl | do 0.6 |
| $CaCO_3$ | do 0.6 |
| pH | 7.0 |

A strain belonging to *Streptomyces humidus* was subjected to aerobic tank culture for 96 hours. To 700 l. of the culture filtrate (pH: 8.5, potency: 35 u./cc. (dilution unit) against *E. coli*) was added 7 kg. (1%) of active carbon, and the mixture was stirred for 30 minutes to adsorb the active compound. The active carbon was eluted with 10 times its volume of methanolic hydrogen chloride for 30 minutes at pH 2.0 to obtain 140 l. of the eluate (potency: 100 u./cc. (dilution unit)). The elution was repeated again to obtain ca. 70 l. of the eluate (potency: 35 u./cc. (dilution unit)). The combined eluates were neutralized with N-NaOH to pH 6.5 and concentrated in vacuo at low temperature to about 300 cc. During the process the separated sodium chloride is removed now and then. 3 l. of anhydrous acetone is added to the concentrated solution, and the precipitated active compound was dried in vacuo to give white powder. The yield was 147 g. or 60% (potency: 100 u./mg. (dilution unit)). The product is negative to maltol reaction but positive to Sakaguchi reaction.

Mutants described in this specification except the mutants used in the preceding Example 8 are induced by such methods as follows:

(i) Mono-spore separation of strain 23572 Y used in the preceding Example 8 gives strain 23572 W.

(ii) Inoculation of the strain Q-97 used in the preceding Example 8 on a dihydrostreptomycin-containing medium gives strain H-120.

The specimen of strain 23572 has been filed with Institute for Fermentation, Osaka (IFO), a Japanese culture collection, and its deposit number is IFO-3520.

A specimen of the said strain 23572 has also been deposited with the American Type Culture Collection, ATCC No. 12760.

What is claimed is:

1. A process for producing dihydrostreptomycin, which comprises cultivating a member selected from the group consisting of a dihydrostreptomycin-producing strain of *Streptomyces humidus* and its natural mutants, induced mutants and variants in an aqueous nutrient-containing medium under aerobic conditions until substantial antibacterial activity due to accumulation of formed dihydrostreptomycin is imparted to said medium.

2. A process for producing dihydrostreptomycin, which comprises cultivating a member selected from the group consisting of a dihydrostreptomycin-producing strain of *Streptomyces humidus* and its natural mutants, induced mutants and variants in an aqueous nutrient-containing medium under aerobic conditions until the antibiotic is accumulated at a concentration of at least 10γ/cc. in the resultant fermentation broth.

3. A process for producing dihydrostreptomycin, which comprises cultivating a member selected from the group consisting of a dihydrostreptomycin-producing strain of *Streptomyces humidus* and its natural mutants, induced mutants and variants in an aqueous nutrient-containing medium under submerged aerobic conditions until substantial antibacterial activity due to accumulation of formed dihydrostreptomycin is imparted to said medium.

4. A process for producing dihydrostreptomycin, which comprises cultivating a member selected from the group consisting of a dihydrostreptomycin-producing strain of *Streptomyces humidus* and its natural mutants, induced mutants and variants in an aqueous nutrient-containing medium under submerged aerobic conditions until the antibiotic is accumulated at a concentration of at least 10γ/cc. in the resultant fermentation broth.

5. A process for producing dihydrostreptomycin, which comprises cultivating a dihydrostreptomycin-producing strain of *Streptomyces humidus* in an aqueous nutrient-containing medium under aerobic conditions until substantial antibacterial activity due to accumulation of formed dihydrostreptomycin is imparted to said medium.

6. A process for producing dihydrostreptomycin, which comprises cultivating a dihydrostreptomycin-producing strain of *Streptomyces humidus* in an aqueous nutrient-containing medium under aerobic conditions until the antibiotic is accumulated at a concentration of at least 10γ/cc. in the resultant fermentation broth.

7. A process for producing dihydrostreptomycin, which comprises cultivating a dihydrostreptomycin-producing strain of *Streptomyces humidus* in an aqueous nutrient-containing medium under submerged aerobic conditions at a temperature of about 24 to 30° C. for about 3 to 8 days.

References Cited in the file of this patent

UNITED STATES PATENTS

| | | |
|---|---|---|
| 2,493,489 | Langlykke et al. | Jan. 3, 1950 |
| 2,498,574 | Peck | Feb. 21, 1950 |

OTHER REFERENCES

Waksman et al.: Bacteriological Reviews, vol. 21, March 1957, pp. 9, 21–22.

Pridham et al.: Applied Microbiology, vol. 6, No. 1, January 1958, pp. 52–79, with particular attention to pp. 52–53.

UNITED STATES PATENT OFFICE

CERTIFICATE OF CORRECTION

Patent No. 2,931,756                     April 5, 1960

Koiti Nakazawa et al.

It is hereby certified that error appears in the above numbered patent requiring correction and that the said Letters Patent should read as corrected below.

In the heading to the printed specification, between lines 8 and 9, insert -- Application March 21, 1957, Serial No. 647,681 --; column 15, first table, column 1, line 4 thereof, for "Glucouse" read -- Glucose --.

Signed and sealed this 6th day of September 1960.

(SEAL)
Attest:

ERNEST W. SWIDER
Attesting Officer

ROBERT C. WATSON
Commissioner of Patents